(12) United States Patent
Dompe et al.

(10) Patent No.: US 11,784,880 B2
(45) Date of Patent: Oct. 10, 2023

(54) METHOD AND SYSTEM FOR FACILITATING EDGE RACK EMULATION

(71) Applicant: Hewlett Packard Enterprise Development LP, Houston, TX (US)

(72) Inventors: Diego Dompe, Escazu (CR); Michael Zayats, Mountain View, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 334 days.

(21) Appl. No.: 16/942,144

(22) Filed: Jul. 29, 2020

(65) Prior Publication Data
US 2022/0038343 A1  Feb. 3, 2022

(51) Int. Cl.
*H04L 41/0866* (2022.01)
*H04L 41/0806* (2022.01)

(52) U.S. Cl.
CPC ...... *H04L 41/0866* (2013.01); *H04L 41/0806* (2013.01)

(58) Field of Classification Search
None
See application file for complete search history.

(56) References Cited

U.S. PATENT DOCUMENTS

| | | |
|---|---|---|
| 10,044,795 B2 | 8/2018 | Reddy et al. |
| 10,313,479 B2 | 6/2019 | Lochhead et al. |
| 2005/0229175 A1* | 10/2005 | McCrory ............ G06F 9/4401 717/177 |
| 2013/0297769 A1* | 11/2013 | Chang ................ G06F 9/5077 709/224 |
| 2018/0309818 A1* | 10/2018 | Park ..................... H04L 43/08 |
| 2019/0294975 A1* | 9/2019 | Sachs .................. G06N 3/0454 |
| 2019/0320040 A1 | 10/2019 | Kottapalli et al. |
| 2020/0125973 A1* | 4/2020 | Townend ............ G06N 20/00 |
| 2020/0174769 A1* | 6/2020 | Zolotow ................ G06F 8/65 |
| 2021/0141832 A1* | 5/2021 | Xue ..................... G06F 16/906 |
| 2021/0191694 A1* | 6/2021 | Maron .................. G06F 9/455 |

(Continued)

OTHER PUBLICATIONS

Agilent Technologies, "Agilent Virtual Rack, Quick Start Guide, Agilent Technologies," Dec. 2007, http://application-notes.digchip.com/018/18-24973.pdf.

(Continued)

*Primary Examiner* — Scott B Christensen
(74) *Attorney, Agent, or Firm* — Park, Vaughan, Fleming & Dowler LLP

(57) ABSTRACT

A system for facilitating emulation in a distributed environment is provided. During operation, the system can obtain configuration of a physical edge rack, which can include one or more physical computing devices. The system can then present an emulated edge rack in a user interface. The emulated edge rack can be a digital twin of the physical edge rack. Based on a user input received via the user interface, the system can emulate a power-on event on the emulated edge rack. The emulated power-on event can emulate a power-on event for the physical edge rack. The system can then emulate the deployment of a component in the powered-on emulated edge rack based on configuration information received via the user interface. The deployed component can be configured based on the configuration information.

20 Claims, 11 Drawing Sheets

(56) References Cited

U.S. PATENT DOCUMENTS

2021/0248289 A1* 8/2021 Fasano .................. G06Q 10/04

OTHER PUBLICATIONS

Dsouza, L., "Digital Modeling Edge Configurator Tool Helps Partners Deploy Edge Computing with Certainty," Nov. 27, 2017, https://blog.apc.com/uk/en/2017/11/27/digital-modeling-edge-configurator/.

Johnson, B., "How Digital Twins Can Optimize Edge Computing Efficiency," Mar. 21, 2018, https://blog.swim.ai/how-digital-twins-can-optimize-edge-efficiency.

* cited by examiner

METHOD AND SYSTEM FOR FACILITATING EDGE RACK EMULATION

BACKGROUND

Field

The present disclosure relates to the emulation of devices. More specifically, the present disclosure relates to a method and system for emulating an edge rack.

BRIEF DESCRIPTION OF THE FIGURES

FIG. A illustrates an exemplary emulation of an edge rack in a distributed environment, in accordance with an embodiment of the present application.

In the figures, like reference numerals refer to the same figure elements.

DETAILED DESCRIPTION

Figure 1A:
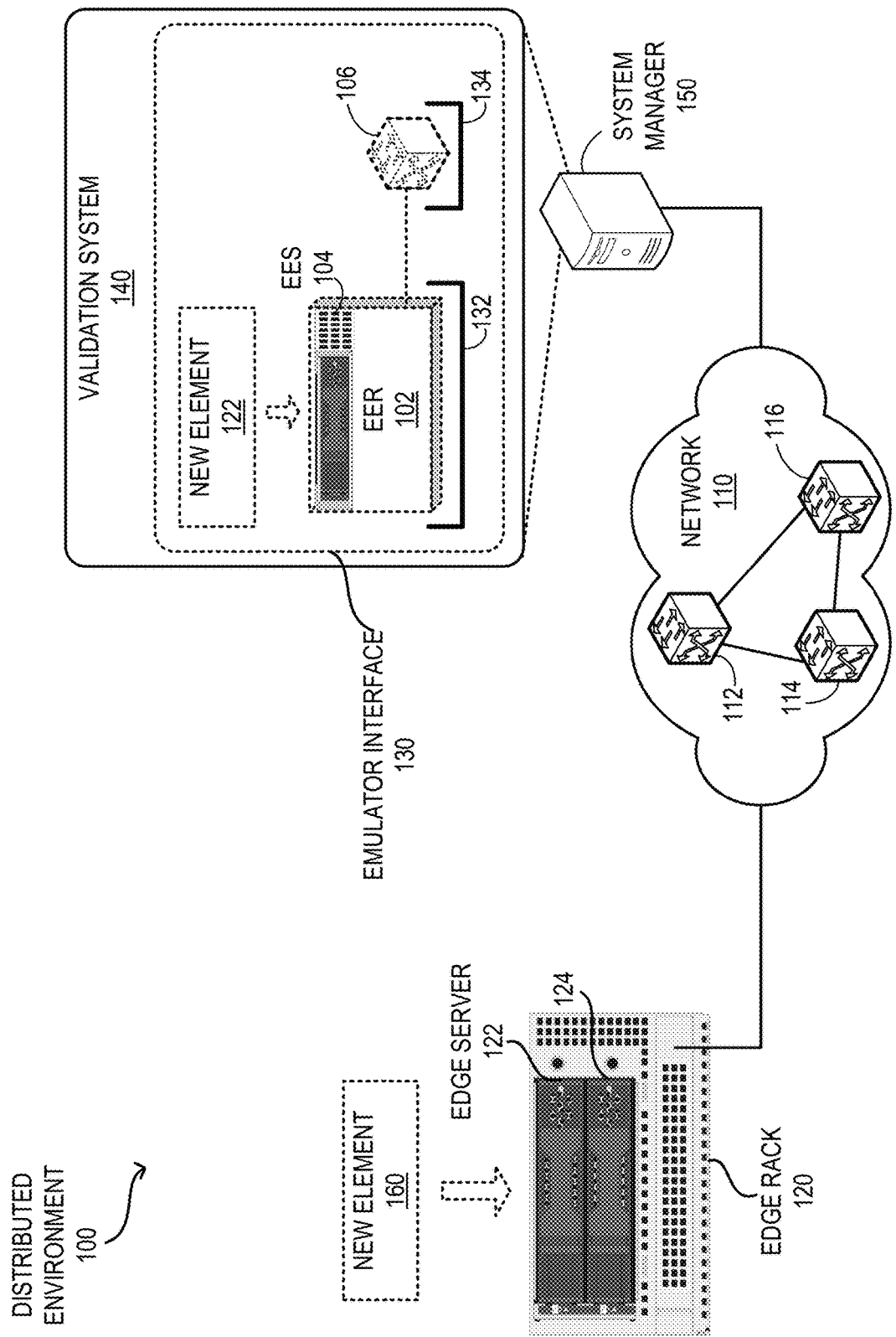
FIG. 1B illustrates exemplary operations associated with the emulation of an edge rack in a distributed environment, in accordance with an embodiment of the present application.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

Overview

The Internet is the delivery medium for a variety of applications running on physical and virtual devices. Such applications have brought with them an increasing demand for efficient data access. As a result, equipment vendors race to build servers, such as edge servers, for efficiently processing and storing data. Typically, an edge server is deployed in a rack of servers, which can be referred to as an edge rack. An edge rack can include one or more servers coupled to each other via a backplane. In this way, a number of edge servers can be deployed within the same bay. With the advancement of the capability of an edge rack, more computations are often pushed to the edge. As a result, deploying high-capacity computing nodes at the edge is becoming the norm. Such a deployment can be facilitated by deploying edge services at the edge of a network.

Some bays can be hot-pluggable and allow plugging-in a new edge server on an operational (i.e., currently running) rack. However, the resources provided by the bay (e.g., network capacity, cooling operations, power consumption, etc.) can be strained due to the deployment of the edge server. In addition to a new server, an application developer may deploy a new feature on the edge rack. Furthermore, the edge rack can be in communication with a large number of network devices. As a result, the deployment of a new element (e.g., a piece of hardware, an application, a configuration, or a feature) to an edge rack can adversely impact the stability of the computing and distributed environment. Therefore, it is often desirable to validate how the deployment of a new element on the edge rack may impact the existing infrastructure.

One embodiment of the present invention provides a system for facilitating emulation in a distributed environment. During operation, the system can obtain the configuration of a physical edge rack, which can include one or more physical computing devices. The system can then present an emulated edge rack in a user interface. The emulated edge rack can be a digital twin of the physical edge rack. Based on a user input received via the user interface, the system can emulate a power-on event on the emulated edge rack. The emulated power-on event can emulate a power-on event for the physical edge rack. The system can then emulate the deployment of a component in the powered-on emulated edge rack based on configuration information received via the user interface. The deployed component can be configured based on the configuration information.

In a variation on this embodiment, the system can present, on the user interface, virtual connectivity among the emulated edge rack and a set of emulated network devices. The system can then emulate network operations of the emulated edge rack with the emulated network devices In a variation on this embodiment, the component can be one of: a compute node facilitating compute operations and a target node facilitating storage operations.

In a variation on this embodiment, the component can be a vendor feature developed for the physical edge rack. The system can then emulate the deployment of the component by emulating a power-cycle for the emulated edge rack. The emulated power-cycle can be a digital twin of a power-cycle of the physical edge rack.

In a variation on this embodiment, the component can be a virtual machine (VM) that represents a virtualized computing device. The system can then emulate the virtual machine deployed on the emulated edge rack.

In a variation on this embodiment, the component can be an emulation of an isolated segment of the emulated edge rack. The isolated segment may belong to an end-to-end slice of resources defined in a high-capacity network.

In a variation on this embodiment, the physical edge rack is turned off and yet to be enabled in the distributed environment.

In a variation on this embodiment, the system can emulate the configuration of the physical edge rack based on a management interface specification implemented in the emulated edge rack.

In a further variation, the system can emulate a hardware component that facilitates the management interface specification in the emulated edge rack. The system can then emulate the provisioning of the emulated edge rack from an emulated switch using the emulated hardware component.

In a variation on this embodiment, the system can receive the configuration of the physical edge rack from a remote device via a distributed management platform. The user interface can be facilitated by the distributed management platform. The system can then execute the power-on event on the physical edge rack via the distributed management platform based on an instruction from the remote device.

The embodiments described herein solve the problem of validating the deployment of a new element on an edge rack by (i) facilitating an emulated edge rack (EER) by generating a digital twin of the edge rack and incorporating the new element into the EER, (ii) configuring the EER based on a platform interface, and (iii) evaluating the EER by simulating the execution of a workload on the EER. This allows an administrator to evaluate the performance and any potential drawbacks of the deployment of the new element on the edge rack.

With existing technologies, validating and evaluating the deployment of an edge rack in a distributed environment can be challenging. An edge rack is a rack of servers deployed at the edge of the distributed environment. The edge of the distributed environment typically couples devices belonging to end-users (or clients) to the distributed environment. When a developer develops a feature for the edge rack, the deployment of the feature on the physical hardware can be manual and error-prone. The edge rack can be managed remotely via a cloud-based management platform. The management platform allows the client to deploy a storage node or a compute node (e.g., install a Linux server) on an edge server in the edge rack, which can reboot a server in the edge rack and cause disruption in the deployment site. Furthermore, the administrator may also remotely power on or reboot the edge rack using the management platform. Such a power cycle can also cause an issue at the deployment site. When the client deploys a new element on an edge rack or deploys a new edge rack, the client may not have an option to accurately emulate how the new element or the new edge rack may impact the existing deployment.

To solve this problem, the management platform can facilitate a validation system capable of providing an EER by efficiently and comprehensively emulating an edge rack. The EER can be a digital twin, which is a virtualized replica, of a physical edge rack. The EER can allow a privileged user (e.g., an administrator or a developer) to validate a new element on an existing rack, the deployment of a new edge rack without the need of a physical edge rack, and the network connectivity of the edge rack. Examples of a new element can include, but are not limited to, a new piece of hardware, such as a new edge server added to the edge rack, a new application developed by the client, a new configuration of an edge server (e.g., as a compute or storage node), and a new feature developed by the vendor or service provider for the edge rack.

For example, when developers develop a new feature for the edge rack, such as a new routing algorithm or a new power management scheme, the validation system can test and validate the new feature on the EER without the need for the physical edge rack. To facilitate the validation, the valuation system can emulate a power cycle on the EER and may determine any issue associated with the new feature. Similarly, when a client enables an edge rack or deploys a compute or storage node on the rack, the edge rack can go through a power cycle and disrupt the existing deployment. The validation system can allow the client to emulate the enablement and deployment on the EER via the management platform. Validating and testing on an EER prior to a physical deployment can lead to significant time savings and error avoidance.

Furthermore, the validation system can facilitate the validation of an application on the EER. For example, a client can configure a web or database server on an emulated edge server (EES) in the EER and determine the performance of the application. In some embodiments, the validation system can facilitate multi-level virtualization. For example, the validation system can allow a user to deploy a virtual machine (VM) on an EES using a VM management center (VMC). This allows the execution of a virtualized device (e.g., the VM) on another independently virtualized device (e.g., the EES or the EER). The VM and the EER are independently virtualized because the VM can be provided by a third party VM vendor.

Unlike a VM, the EER can emulate the power-cycle of an edge rack. In other words, instead of merely facilitating virtualized hardware on a server, the validation system can emulate the behavior and operations of the server. Consequently, the validation system can emulate the initialization or termination operations executed on an edge rack and individual edge servers in the edge rack during a power cycle (e.g., a new deployment or a reboot). As a result, the EES and the EER can comprehensively represent an edge server and an edge rack, respectively. Moreover, the validation system can emulate a management interface (MI) specification, such as Intelligent Platform Management Interface (IPMI) and Redfish specification, on the EES and EER. In this way, a client can validate and test applications, servers, storage, and networking on the EER.

In this disclosure, the term "switch" is used in a generic sense, and it can refer to any standalone or fabric switch operating in any network layer. "Switch" should not be interpreted as limiting embodiments of the present invention to layer-2 networks. Any device that can forward traffic to an external device or another switch can be referred to as a "switch." Any physical or virtual device (e.g., a virtual machine/switch operating on a computing node) that can forward traffic to an end device can be referred to as a "switch." Examples of a "switch" include, but are not limited to, a layer-2 switch, a layer-3 router, a routing switch, a component of a Gen-Z network, or a fabric switch comprising a plurality of similar or heterogeneous smaller physical and/or virtual switches.

The term "packet" refers to a group of bits that can be transported together across a network. "Packet" should not be interpreted as limiting embodiments of the present invention to layer-3 networks. "Packet" can be replaced by other terminologies referring to a group of bits, such as "message," "frame," "cell," "datagram," or "transaction."

System Architecture

FIG. 1A illustrates an exemplary emulation of an edge rack in a distributed environment, in accordance with an embodiment of the present application. As illustrated in FIG. 1, a distributed environment 100 can include a network 110, which can include switches 112, 114, and 116. Network 110 can be a wire-area network (e.g., the Internet). In some embodiments, network 110 is a Gen-Z network, and a respective switch of network 110, such as switch 112, is a Gen-Z component. A Gen-Z network can be a memory-semantic fabric that can be used to communicate to the devices in a computing environment. By unifying the communication paths and simplifying software through simple memory-semantics, Gen-Z components can facilitate high-performance solutions for complex systems. Under such a scenario, communication among the switches in network 110 is based on memory-semantic fabric. In some further embodiments, network 110 is an Ethernet and/or IP network, and a respective switch of network 110, such as switch 102, is an Ethernet switch and/or IP router. Under such a scenario, communication among the switches in network 110 is based on Ethernet and/or IP.

With existing technologies, validating and evaluating the deployment of an edge rack 120 in distributed environment 100 can be challenging. Edge rack 120 can be a rack of edge servers 122 and 124. Edge rack 120 can be deployed at the edge of distributed environment 100, which may couple devices belonging to end-users (or clients) to distributed environment 100. When a developer develops a feature for edge rack 120, the deployment of the feature on the physical hardware can be manual and error-prone. Edge rack 120 can be managed remotely via a cloud-based management platform facilitated by a system manager 150. System manager 150 can be a remote computing device (or an application running on a computing device) that can allow a user to manage one or more devices in distributed environment 100.

System manager 150 can allow the client to deploy a storage or compute node (e.g., install a Linux server) on edge server 122 or 124. As a result, the corresponding edge server can be rebooted and cause disruption in the deployment site. Furthermore, an administrator may also remotely power on or reboot edge rack 120 using system manager 150. Such a power cycle can also cause an issue in distributed environment 100. When the client deploys a new element 160 on edge rack 120 or if edge rack 120 is a newly-deployed edge rack, the client may not have an option to accurately emulate how new element 160 or new edge rack 120 may impact the existing components in distributed environment 100.

To solve this problem, the management system manager 150 can facilitate a validation system 140 that can facilitate an emulation environment that can be used for validating an edge rack. Validation system 140 can be equipped with an emulator interface 130 for providing instructions that can emulate an entity. For example, interface 130 can allow a user to select from a set of entities that can be emulated by validation system 140. Examples of such an entity include, but are not limited to, an edge rack, an edge server on the edge rack, a switch, a cell tower, and a network link. The selected entity can then appear on interface 130. By highlighting the entity on interface 130 (e.g., by touching or gesturing based on corresponding sensors or clicking using a pointing device), the user can also configure the entity, apply a workload on the entity, and emulate the execution of operations on the entity.

During operation, a user can define an EER 102 in interface 130. EER 102 can be a digital twin, which is a virtualized replica, of edge rack 120. Hence, EER 120 can be an efficient and comprehensive emulation edge rack 120. A privileged user can use interface 130 to new element 160 on edge rack 120. Examples of new element 160 can include, but are not limited to, a new piece of hardware, such as a new edge server added to edge rack 120, a new application developed by the client, a new configuration of edge server 122 or 124, and a new feature developed by the vendor or service provider for edge rack 120.

Furthermore, the user can also use interface 130 to emulate the deployment of a new edge rack using EER 102. As a result, the user can validate the deployment of the new edge rack without the need for a physical edge rack. The new edge rack can be physically present in distributed environment 100 but has not been turned on and enabled. By emulating EER 102 as a digital twin of the new edge rack based on the configuration (e.g., the specification of the new edge rack), the user can validate and test the impact of deploying the new edge rack in distributed environment 100 without the need for the physical edge rack. If the user is satisfied with the performance and impact of EER 102, the user can remotely turn on the new edge rack in distributed environment 100 (e.g., from system manager 150).

The user can also deploy an individual EES 104 in EER 102 using interface 130. Furthermore, the user can define network connectivity EER 102 by emulating a switch 106 and the network connectivity between EER 102 and emulated switch 106. Switch 106 can be digital twin of a switch in network 110. In some embodiments, for a respective emulated element, validation system 140 can define a container. For example, EER 102 or switch 106 can be implemented in containers 132 and 134, respectively. A respective container can facilitate abstraction for the emulated element running on the container from the underlying environment (e.g., validation system 140) and separation from other emulated elements.

When the user defines a network connection between EER 102 and switch 106 in interface 130, validation system 140 can establish an inter-container communication between containers 132 and 134. If the user injects traffic between EER 102 and switch 106, validation system 140 can use the inter-container communication to emulate traffic forwarding between them. Validation system 140 can use a network emulation technique to emulate traffic between emulated entities. For example, validation system 140 can use open-source emulators, such as common open research emulator (CORE) and extendable mobile ad-hoc network emulator (EMANE), for emulating traffic between emulated entities. If containers 132 and 134 are defined with their respective process space (e.g., within process identifier namespace), the processes defined for a container may be restricted within that container. Under such a scenario, validation system 140 can use one or more inter-process communication techniques to establish inter-container communication.

If new element 160 is a new feature developed for edge rack 120, validation system 140 can test and validate new element 160 on EER 102 without deploying the feature on edge rack 120. For example, if new element 160 is a new implementation of a routing algorithm or a new power management scheme for edge rack 120, the developers can test and validate new element 160 on EER 102. To facilitate the validation, valuation system 140 can emulate a power cycle on EER 102 and may determine any issue associated with the new feature. Upon determining an error or a bug, the developers can implement corrective actions and re-evaluate the updated new element 160 on EER 102. Upon successful validation, the developers can determine that new element 160 can operate with stability and mitigated errors. The developers can then deploy the validated and stable version of new element 160 on edge rack 120.

If new element 160 is a new deployment of a compute or storage node on edge server 122 or 124, the edge server can go through a power cycle and disrupt the existing deployment. Validation system 140 can allow the client to emulate the enablement and deployment of the node on EES 104 in EER 102 via interface 130 using system manager 150. Validation system 140 can then emulate the power cycle on EES 104. However, because of the emulation process, validation system 140 can emulate the execution of operations involved in the power cycle faster than that on the physical hardware (e.g., on edge server 122 or 124). As a result, the client can quickly validate the deployment of new element 160. Similarly, if new element 160 is a new application to be deployed on edge server 122 or 124, validation system 140 can facilitate the validation of the application on EES 104 in EER 102 via interface 130. In this way, validation system 140 can allow the client to determine the performance of the application and determine whether to deploy the application in distributed environment 100.

Figure 1B:
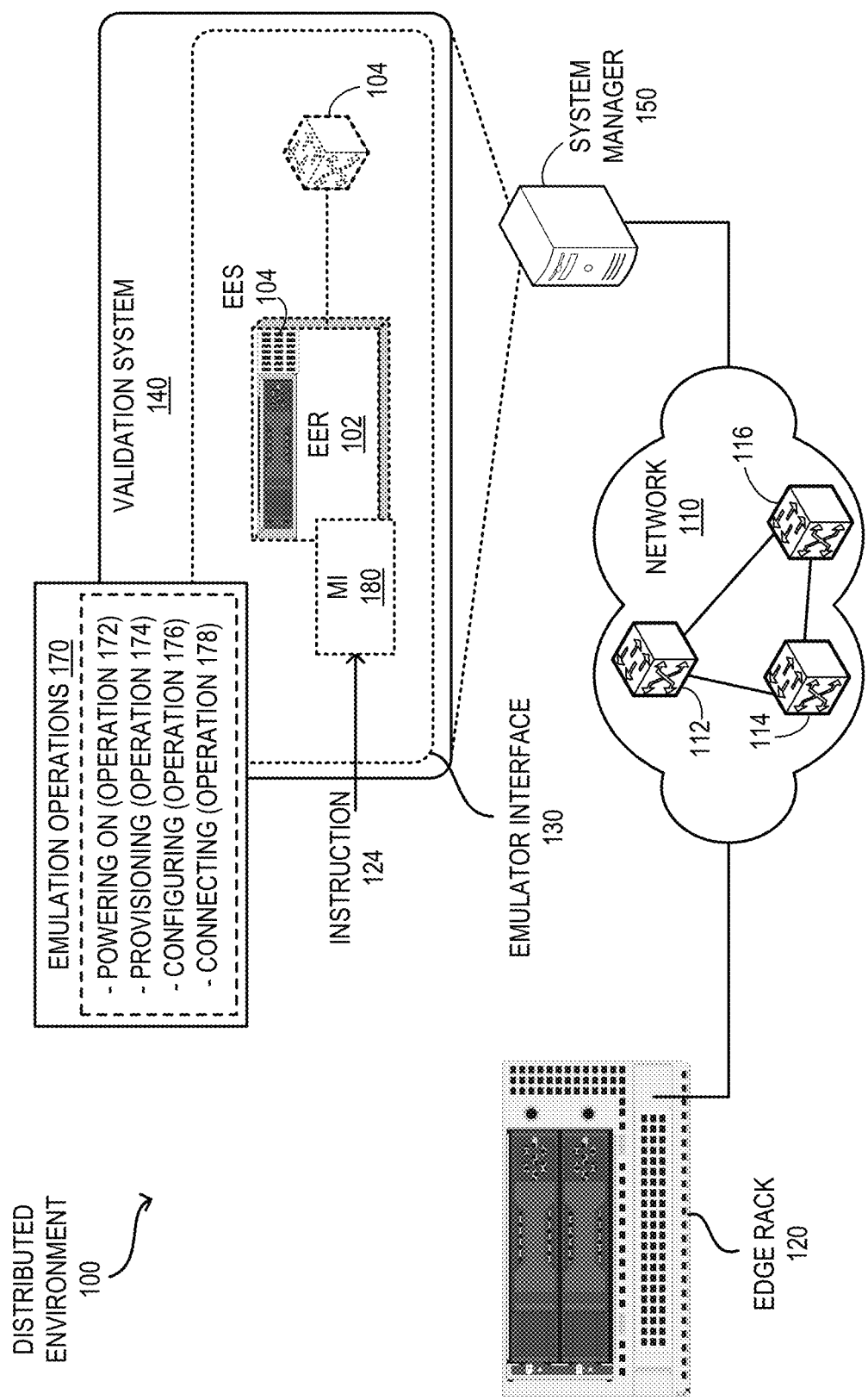

FIG. 1B illustrates exemplary operations associated with the emulation of an edge rack in a distributed environment, in accordance with an embodiment of the present application. If the client wishes to deploy an edge rack, the client can remotely enable (or power on) a new edge rack in distributed environment 100 using system manager 150. To validate the deployment, instead of enabling the physical edge rack, the client can emulate the deployment by emulating the deployment of EER 102 via interface 130 using system manager 150. Because of the emulation process, validation system 140 can emulate the execution of operations involved in the powering-on process faster than that on the physical hardware. As a result, the client can quickly validate the deployment of a new edge rack.

Furthermore, validation system 140 can allow the client to emulate network latency and jitter based on the network connectivity between EER 102 and switch 106. Emulating network latency and jitter can indicate the behavior of an application on EER 102, which can be relevant to the evaluation of the edge of distributed environment 100. Upon successful validation, the client can enable a physical edge rack in distributed environment 100. Unlike a VM, EER 102 can emulate the power-cycle of an edge rack, such as edge rack 120. In other words, instead of merely facilitating virtualized hardware on a server, validation system 140 can emulate the behavior and operations of the physical edge rack. Consequently, validation system 140 can emulate the initialization or termination operations executed on EER 102 and individual edge servers, such as EES 104, during a power cycle (e.g., a new deployment or a reboot). As a result, EER 102 and EES 104 can comprehensively represent an edge rack and an edge server, respectively.

Validation system 140 can emulate a number of initialization operations associated with the deployment of EER 102. These emulation operations 170 can include powering on (operation 172), provisioning (operation 174), configuring (operation 176), and connecting (operation 178). Powering on operation 174 can emulate the behavior of a physical edge server powering on and include emulation of turning on the power supply, cooling system, backplane, and any auxiliary systems of EER 102. Powering on operation 174 can also include emulating the powering on of individual EES in EER 102. Provisioning operation 174 can emulate the behavior of provisioning for individual clients on a physical edge server and include emulation of provisioning of hardware resources on EER 102 for one or more clients.

Furthermore, configuring operation 176 can emulate the behavior of configuring each component of EER 102 and include emulation of configuring individual EES, such as EES 104, in EER 102. Configuring operation 176 can also include configuration of network interfaces and firmware of EER 102. Connecting operation 178 can emulate the behavior of connecting EER 102 to other network elements, such as switch 104, and include emulation of configuring a network for EER 102. In some embodiments, connecting operation 178 includes connecting EER 102 and switch 104 to a network emulator.

In some embodiments, validation system 140 can emulate a management interface specification 180 on EER 102. Examples of management interface specification 180 can include, but are not limited to, IPMI and Redfish specifications. This allows a client to apply an instruction 124 on EER 102 that may configure applications, servers, storage, and networking on EER 102. Validation system 140 may emulate a hardware entity that can facilitate management interface specification 180 in EER 102. In other words, validation system 140 may provide the corresponding virtualized hardware entity in EER 102

For example, if management interface specification 180 is based on IPMI, validation system 140 can emulate a baseboard management controller (BMC) in EER 102. Instruction 124 can facilitate one or more operations of emulation operations 170. Examples of instruction 124 include, but are not limited to, the remote monitoring or changing of firmware settings (e.g., basic input/output system (BIOS) settings) of EER 102 prior to the booting up of the operating system (OS), turning on or off the power to EER 102, and secure remote access to EER 102 in a failure scenario (e.g., hardware or software failure).

Typically, the BMC in EER 102 may not be accessible from outside of a local network of EER 102 to ensure secure access. With existing technologies, a compute node emulated on EER 102 may facilitate the logic for provisioning using the BMC. Validation system 140 can emulate the logic for provisioning using the BMC in switch 106. As a result, a user can provision EER 102 from switch 106 using system manager 150 via network 110. This allows the user to provision EER 102 from the cloud without requiring a deployment of a compute node on EER 102. It should be noted that, since EER 102 and switch 106 are digital twins of edge rack 120 and a switch in network 110 (e.g., switch 112), the corresponding physical devices can also incorporate this feature. Therefore, the user can provision edge rack 120 from a switch in network 110.

Figure 2:
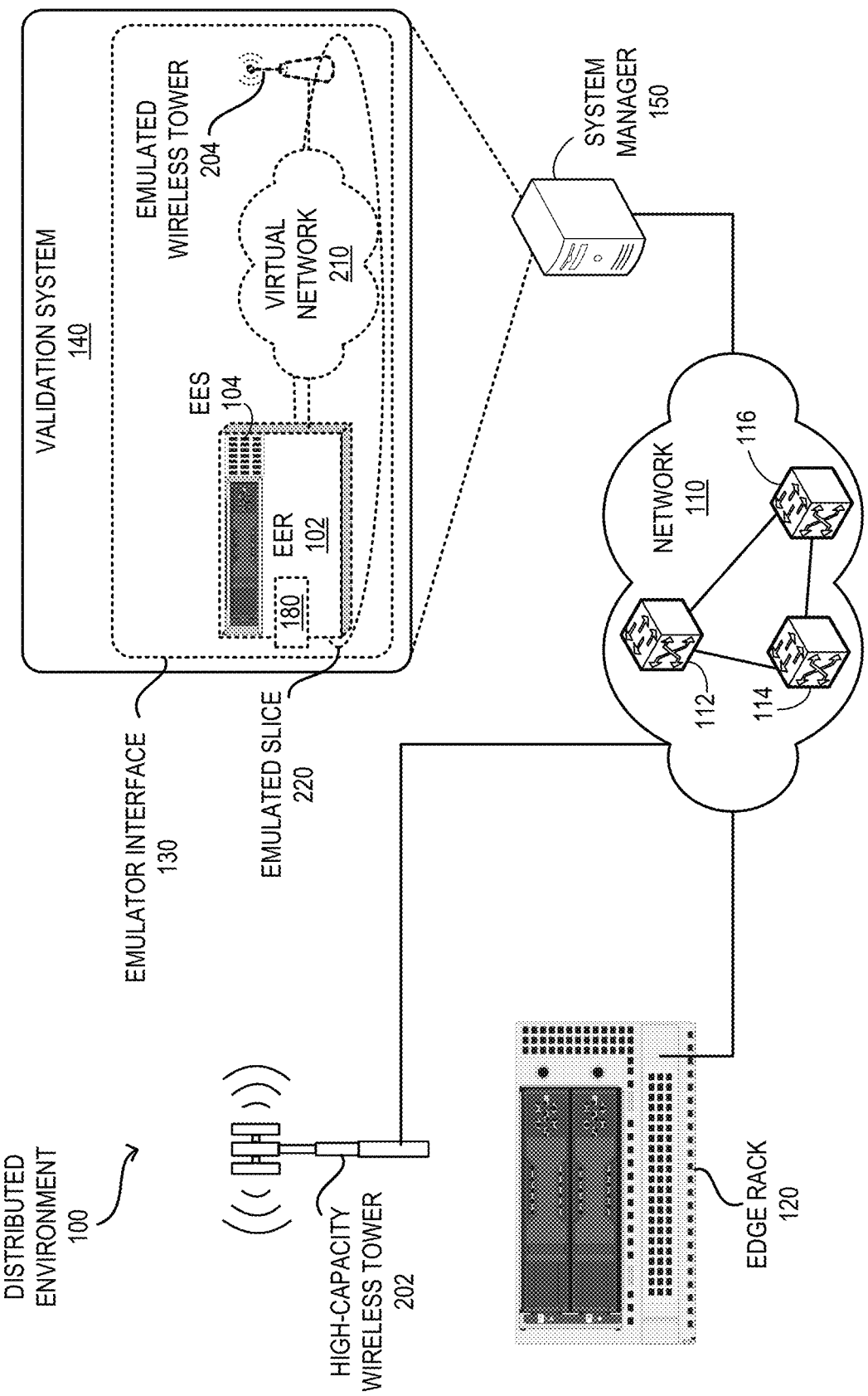
FIG. 2 illustrates an exemplary emulated slice in a high-capacity distributed environment comprising an edge rack, in accordance with an embodiment of the present application.

FIG. 2 illustrates an exemplary emulated slice in a high-capacity distributed environment comprising an edge rack, in accordance with an embodiment of the present application. If distributed environment 100 is a high-capacity distributed environment, distributed environment 100 can include a high-capacity wireless network, such a fifth-generation (5G) cellular network, provided by at least a high-capacity wireless tower 202 (e.g., a 5G cellular tower). In a high-capacity distributed environment, each element, such as edge rack 120, network 110, and tower 202, can be provisioned for individual clients by generating a slice for the client. A respective slice can be an isolated end-to-end network configured for a particular client (e.g., based on the requirement of one or more applications deployed by the client).

Validation system 140 can emulate a virtual network 210 coupled to EER 102 and a wireless tower 204. A user can then emulate a slice 220 via interface 130. To do so, the user may provision EER 102, network 210, and tower 204 for slice 220. For example, the user can provision EER 102 for slice 220 (e.g., using management interface 180, as described in conjunction with FIG. 1B). In this way, validation system 140 can allow the user to test how edge rack 120 may perform without provisioning the slices edge rack 120. Since provisioning of a slice can be a dynamic and resource-intensive process, the user can efficiently determine the effectiveness of a slice by testing the provisioning of the slice on EER 102 prior to provisioning on physical edge rack 120.

Emulation of slice 220 on EER 102 can include the allocation of a portion of each component of EER 102 for slice 220. For example, validation system 140 can obtain the provisioning information via management interface 180 and emulate the powering-on operation on EER 102. EER 102 can then provision the emulated hardware resources of EER 102 for slice 220 (e.g., configurations for network cards and storage devices). Validation system 140 can also allow the user to incorporate desired software resources, such as the operating system and certificates, on the allocated provisioned emulated hardware. The incorporation of software resources allows the user to validate the provisioning of slice 220 on EER 102. Upon successful validation, the user may provision a slice with a similar configuration in distributed environment 100 (e.g., on edge rack 120 and tower 202).

Figure 3:
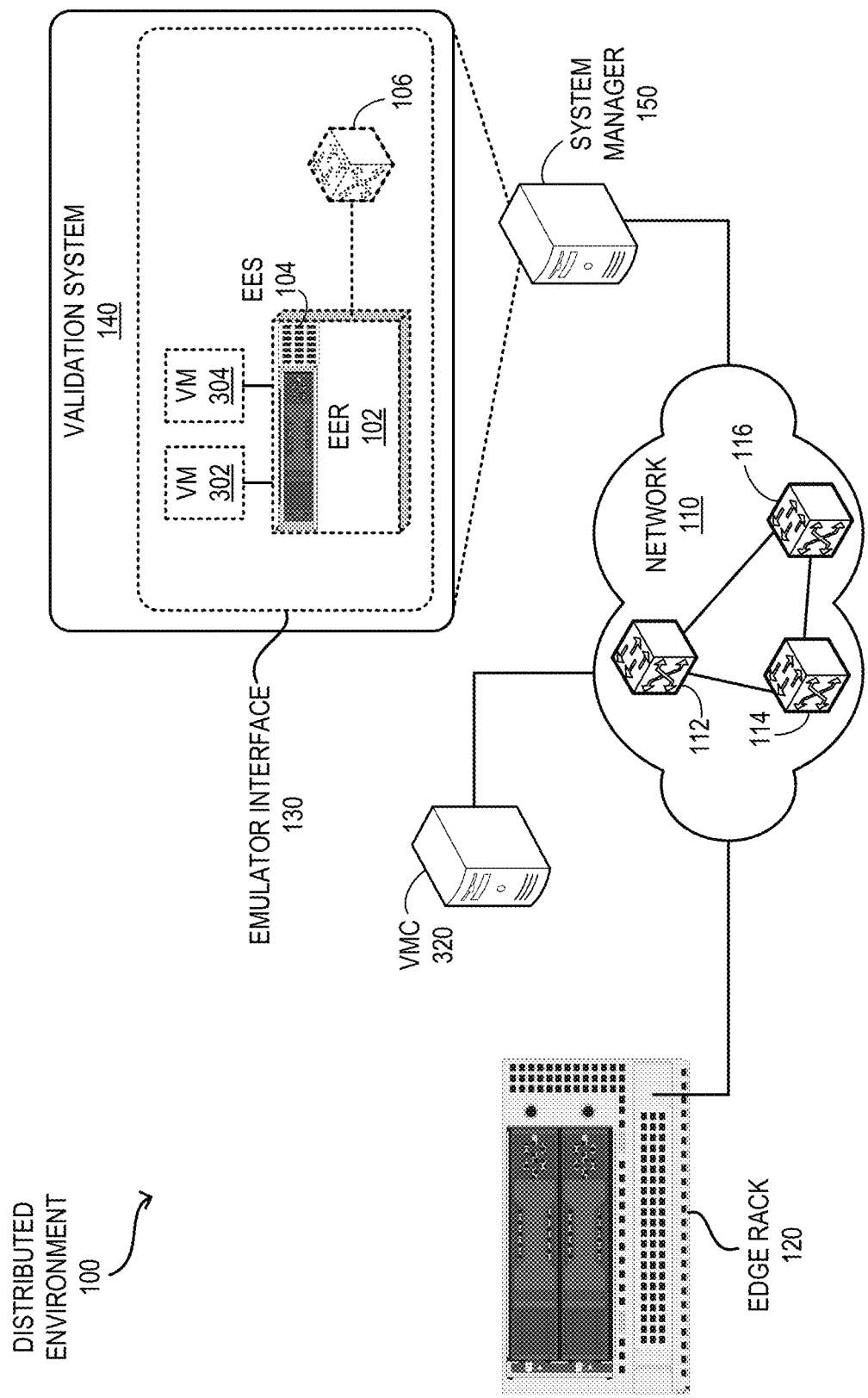
FIG. 3 illustrates exemplary virtual machines (VMs) deployed on an emulated edge rack, in accordance with an embodiment of the present application.

FIG. 3 illustrates exemplary VM deployed on an emulated edge rack, in accordance with an embodiment of the present application. In some embodiments, validation system 140 can facilitate multi-level virtualization. For example, validation system 140 can allow a user to deploy VMs 302 and 304 on EES 104 using a VMC 320. Consequently, validation system 140 can emulate the execution of a virtualized device (e.g., VM 302 or 304) on another independently virtualized device (e.g., EER 102 and EES 104). VM 302 (or 304) and EER 102 are independently virtualized because VMs 302 and 304 can be provided by a third party VM vendor.

To facilitate the provisioning, validation system 140 can incorporate a virtualization entity that can be configured from VMC 320 and can run one or more VMs. For example, validation system 140 can emulate a hypervisor on EES 104. As a result, the user can use VMC 320 without changing the virtualization platform associated with VMC 320. VMC 320 can be any management system (e.g., a vCenter or a system center) that allows provisioning and configuring of a VM.

Operations

Figure 4A:
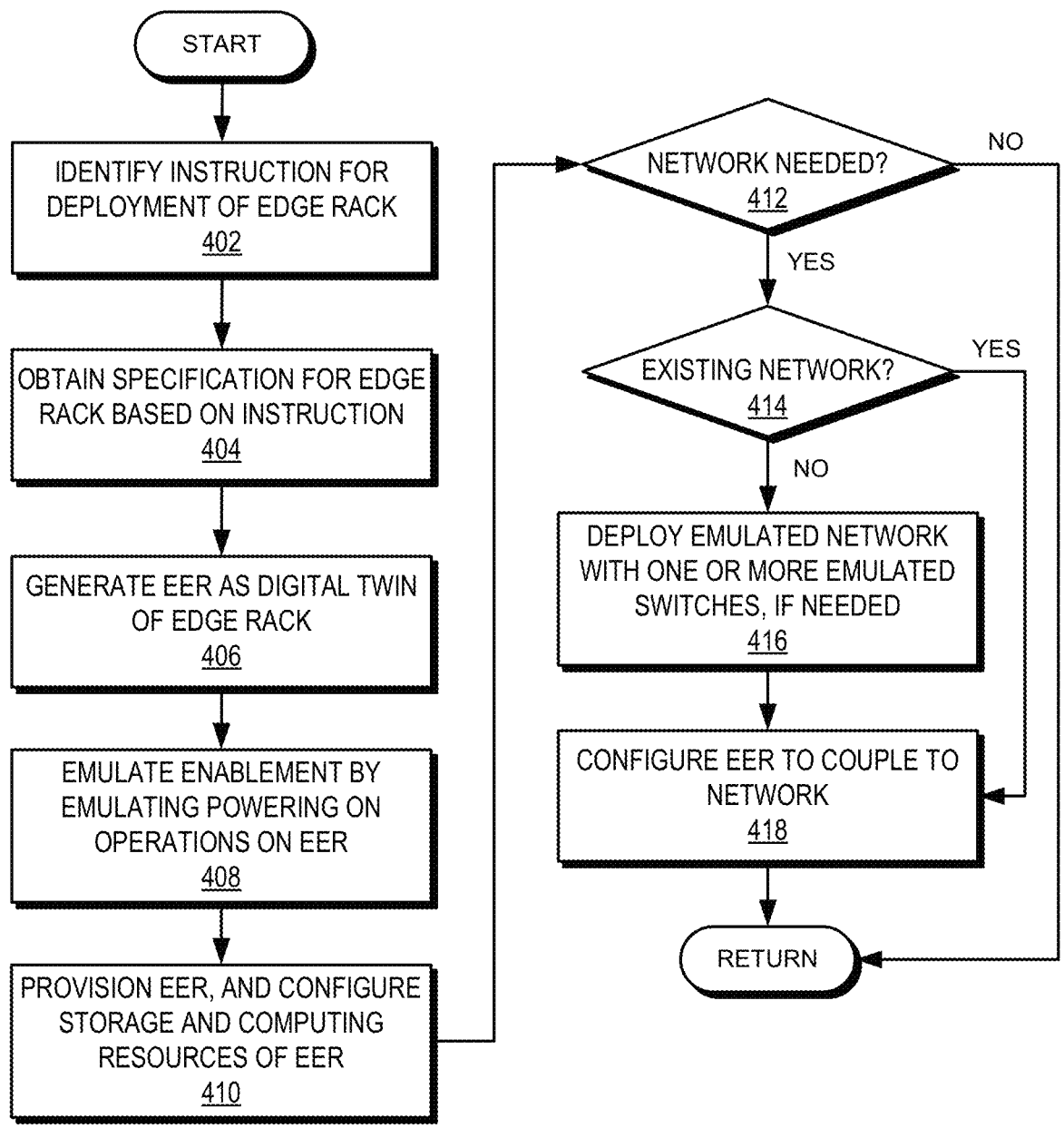
FIG. 4A presents a flowchart illustrating the process of emulating an edge rack, in accordance with an embodiment of the present application.

FIG. 4A presents a flowchart illustrating the process of emulating an edge rack, in accordance with an embodiment of the present application. During operation, a validation system on a system manager can identify an instruction for the deployment of an edge rack (operation 402) and obtain the specification for the edge rack based on the instruction (operation 404). The system can then generate an EER as a digital twin of the edge rack (operation 406) and emulate the enablement of the edge rack by emulating the powering on operations on the EER (operation 408). Subsequently, the system can provision the EER, and configure the storage and computing resources of the EER (operation 410).

The system can check whether a network is needed for the emulation (e.g., based on a user input) (operation 412). If a network is needed, the system can check whether there is an existing relevant network in the emulation environment already exists (operation 414). If the network does not exist, the system can deploy an emulated network with one or more emulated switches, if needed (operation 416). If the network exists (operation 414) or upon deploying an emulated network (operation 416), the system can configure the EER to couple to the network (operation 418).

Figure 4B:
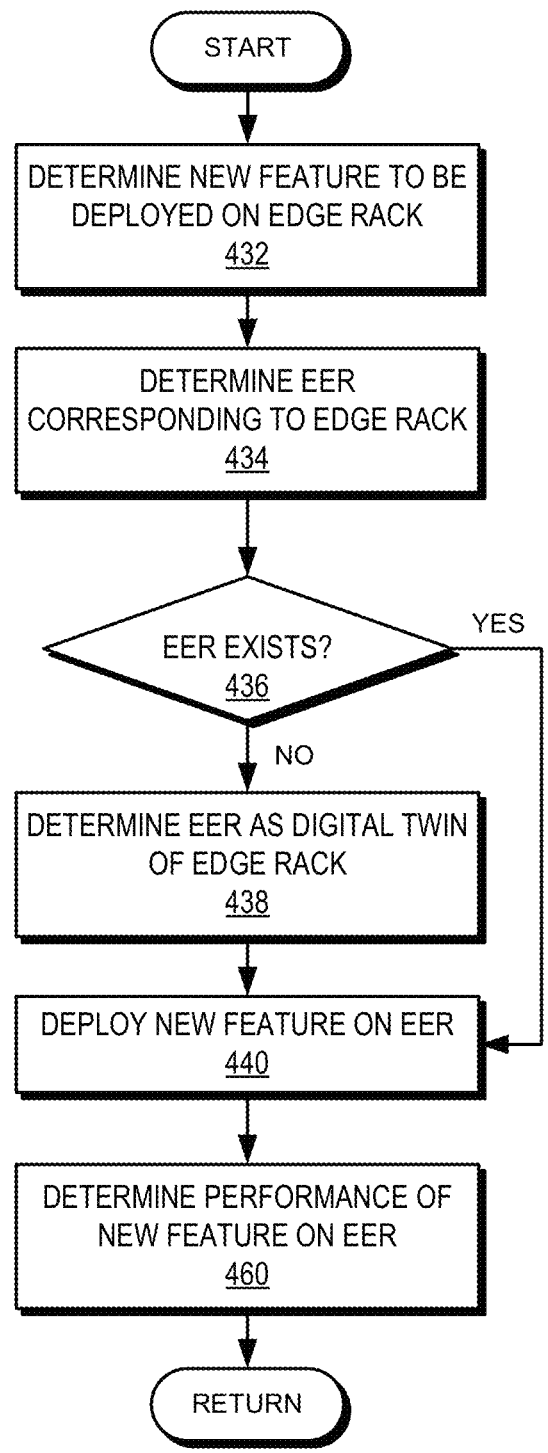
FIG. 4B presents a flowchart illustrating the process of deploying a new feature on an emulated edge rack (EER), in accordance with an embodiment of the present application.

FIG. 4B presents a flowchart illustrating the process of deploying a new feature on an EER, in accordance with an embodiment of the present application. During operation, a validation system on a system manager can determine a new feature that is to be deployed on an edge rack (operation 432). Accordingly, the system can determine an EER corresponding to the edge rack (operation 434) and checks whether the EER exists (operation 436). If the EER does not exist, the system can determine an EER as a digital twin of the edge rack (operation 438), as described in conjunction with FIG. 4A. If the EER exists (operation 436) or upon determining the EER (operation 438), the system can then deploy the new feature on the EER (operation 440) and determine the performance of the new feature on the EER (operation 442).

Figure 4C:
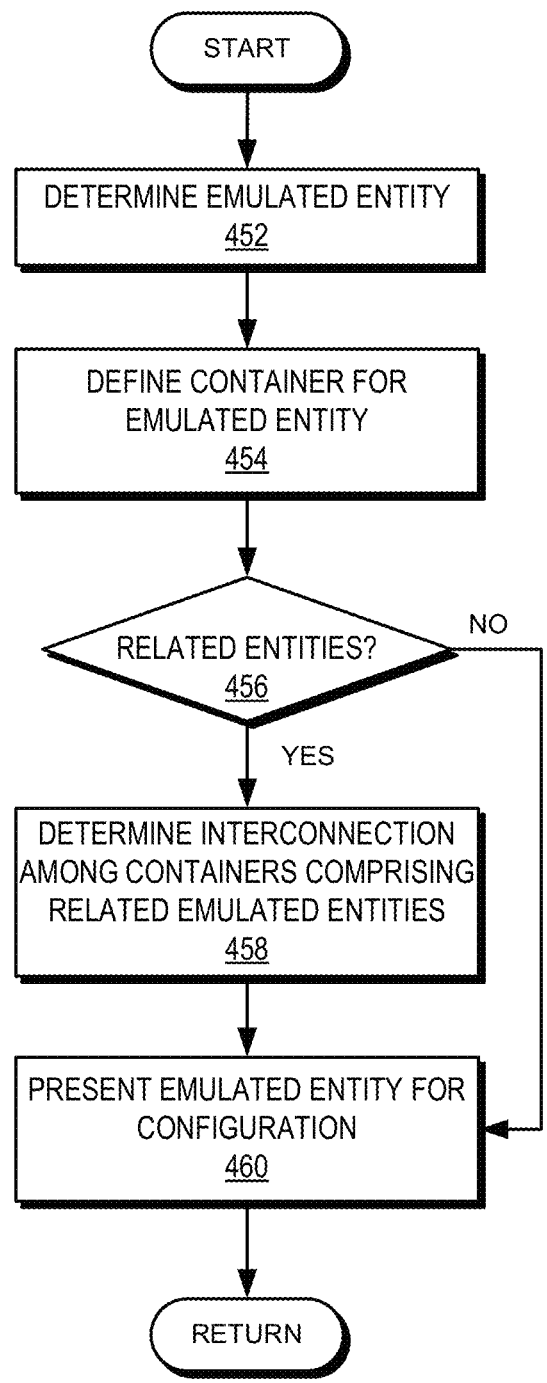
FIG. 4C presents a flowchart illustrating the process of deploying an emulated entity, in accordance with an embodiment of the present application.

FIG. 4C presents a flowchart illustrating the process of deploying an emulated entity, in accordance with an embodiment of the present application. During operation, a validation system on a system manager can determine an emulated entity (operation 452). Examples of an emulated entity include, but are not limited to, an edge rack, an edge server on the edge rack, a switch, a cell tower, and a network link. The system can then define a container for the emulated entity (operation 454) and determine whether there are related entities (operation 456). If there are related entities, the system can determine the interconnection among containers comprising related emulated entities (operation 458). If there are no related entities (operation 456) or upon determining the interconnection (operation 458), the system can present the emulated entity for configuration (operation 460).

Figure 5A:
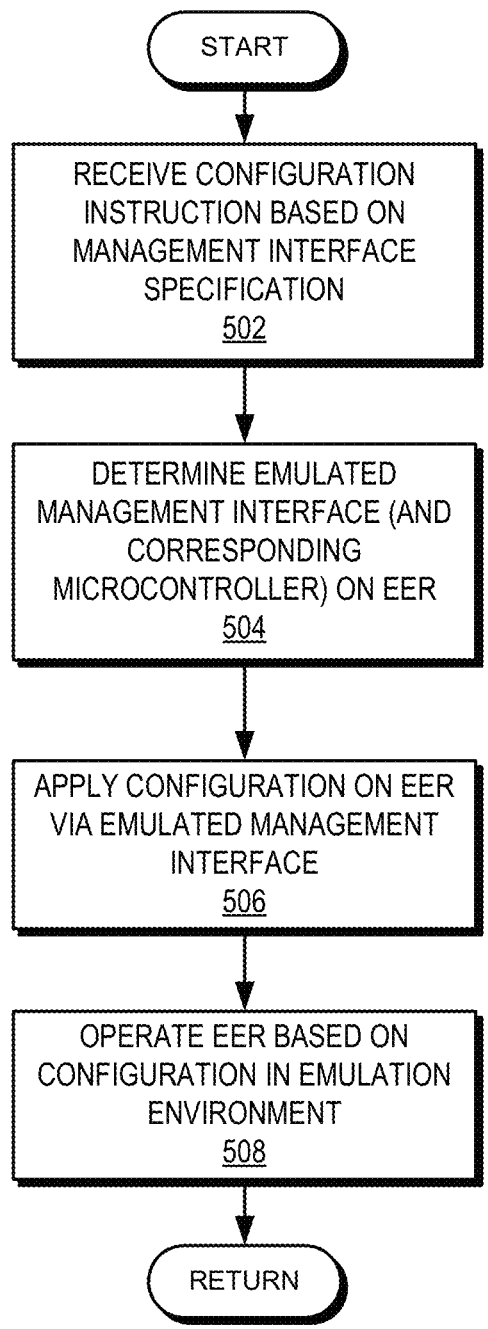
FIG. 5A presents a flowchart illustrating the process of configuring an EER based on a platform interface, in accordance with an embodiment of the present application.

FIG. 5A presents a flowchart illustrating the process of configuring an EER based on a platform interface, in accordance with an embodiment of the present application. During operation, a validation system on a system manager can receive a configuration instruction based on a management interface specification (operation 502). The system can then determine the emulated management interface (and corresponding microcontroller) on the EER (operation 504) and apply the configuration on the EER via the emulated management interface (operation 506). Subsequently, the system can operate the EER based on the configuration in the emulation environment (operation 508).

Figure 5B:
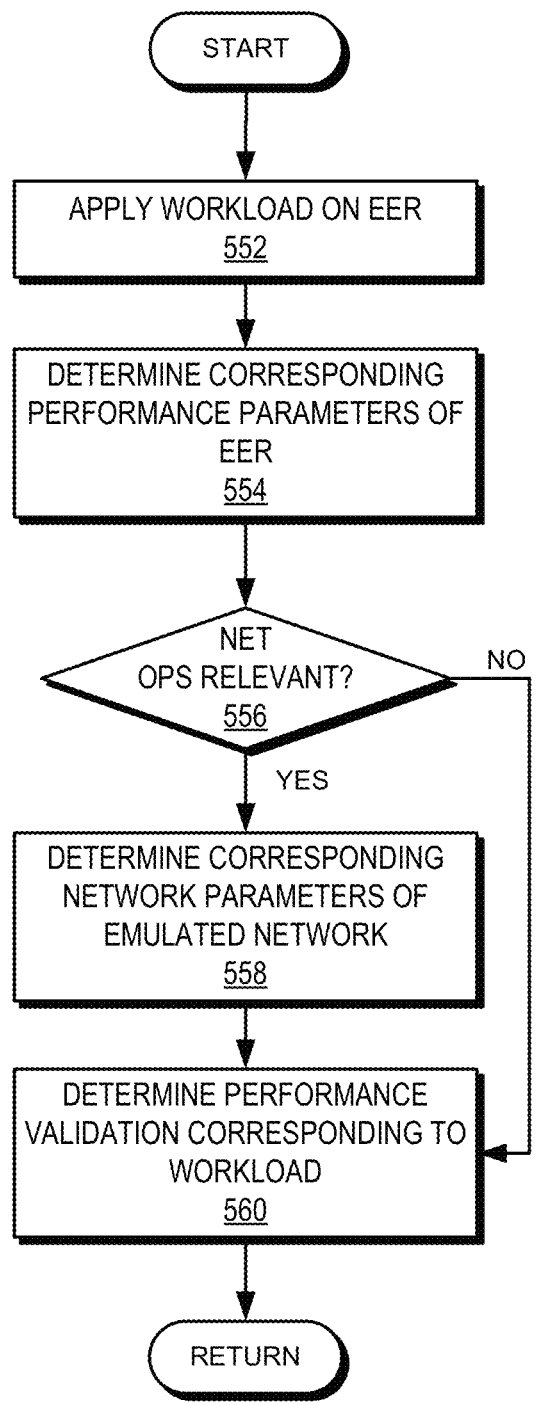
FIG. 5B presents a flowchart illustrating the process of validating the performance of an EER, in accordance with an embodiment of the present application.

FIG. 5B presents a flowchart illustrating the process of validating the performance of an EER, in accordance with an embodiment of the present application. During operation, a validation system on a system manager can apply a workload on the EER (operation 552) and determine corresponding performance parameters for EER (operation 554). The system can then determine whether network operations are relevant (operation 556). If network operations are relevant, the system can determine the corresponding network parameters of the emulated network (operation 558). On the other hand, if network operations are not relevant (operation 556) or upon determining the network parameters (operation 558), the system can determine the performance validation corresponding to the workload (operation 560).

Exemplary System

Figure 6:
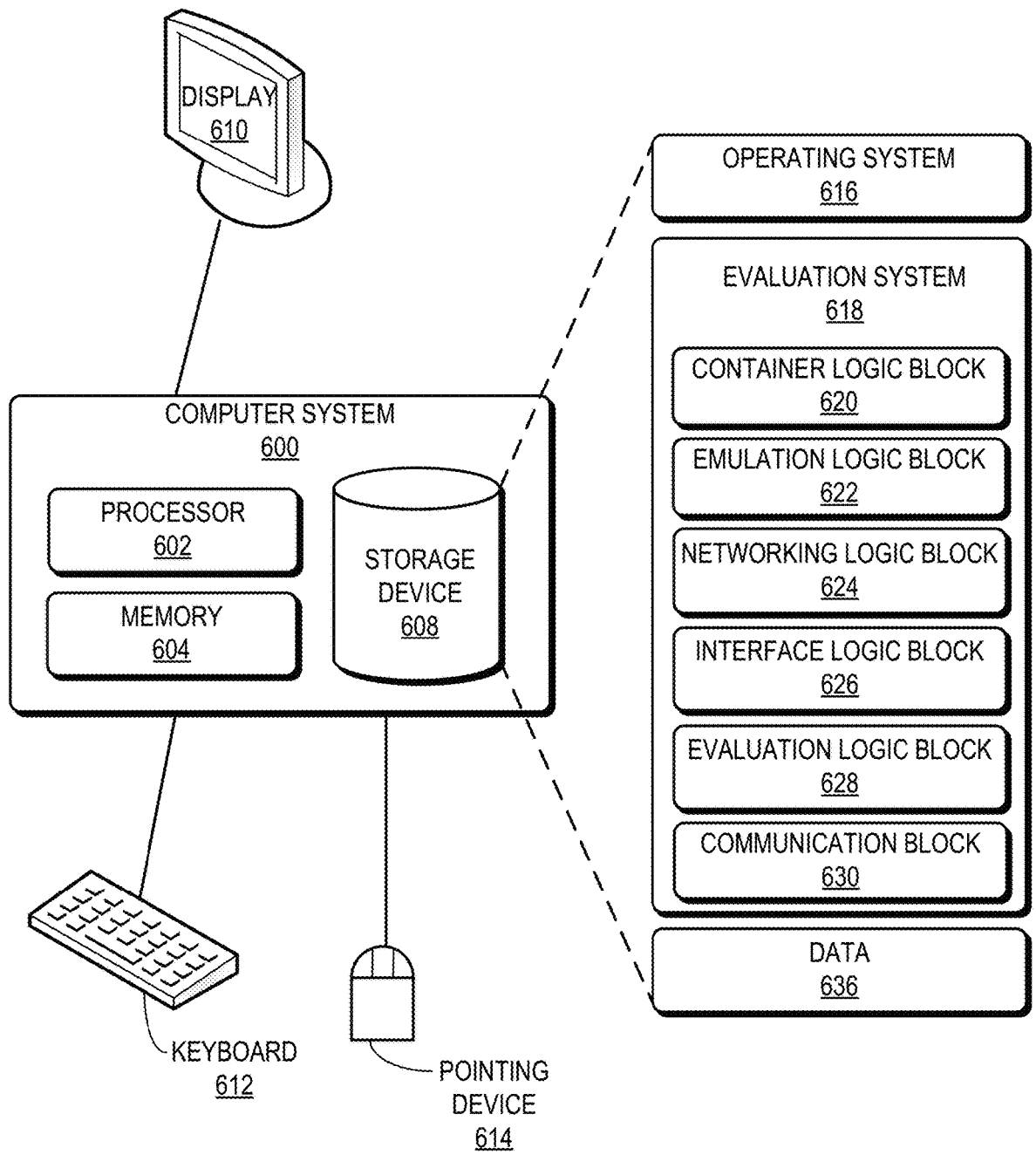
FIG. 6 illustrates an exemplary computer system that facilitates the emulation of an edge rack, in accordance with an embodiment of the present application.

FIG. 6 illustrates an exemplary computer system that facilitates the emulation of an edge rack, in accordance with an embodiment of the present application. Computer and communication system 600 includes a processor 602, a memory device 604, and a storage device 608. Memory device 604 can include a volatile memory device (e.g., a dual in-line memory module (DIMM)). Furthermore, computer and communication system 600 can be coupled to a display device 610, a keyboard 612, and a pointing device 614. Storage device 608 can store an operating system 616, an evaluation system 618, and data 636. Evaluation system 618 can facilitate the operations of evaluation system 140.

Evaluation system 618 can include instructions, which when executed by computer and communication system 600 can cause computer and communication system 600 to perform methods and/or processes described in this disclosure. Specifically, evaluation system 618 can include instructions for generating a container for a respective emulated entity (container logic block 620). Furthermore, evaluation system 618 can include instructions for emulating an entity, such as an edge rack, an edge server, a switch, a cell tower, and a network link (emulation logic block 622).

In particular, evaluation system 618 can include instructions for emulating powering on, powering off, and power cycle operations of a respective emulated entity (emulation logic block 622). Moreover, evaluation system 618 can include instructions for deploying a VM on an emulated entity (emulation logic block 624). Evaluation system 618 can also include instructions for emulating a slice of a high-capacity wireless network on an emulated entity (emulation logic block 624).

Evaluation system 618 can also include instructions for emulating networking operations among the emulated entities (e.g., sending and receiving control and data packets) (networking logic block 624). Evaluation system 618 can further include instructions for facilitating a management interface in an emulated entity (interface logic block 626). In addition, evaluation system 618 can include instructions for emulating a hardware device in an emulating entity for facilitating the management interface (interface logic block 626). Evaluation system 618 can then include instructions for evaluating the performance of an emulated entity (e.g., based on a workload) (evaluation logic block 628).

Evaluation system 618 may further include instructions for sending and receiving messages (communication logic block 630). Data 636 can include any data that can facilitate the operations of evaluation system 618. Data 636 can include, but are not limited to, information related to a container, an emulated entity, a management interface specification, configuration and provisioning information of an emulated entity, a slice of a high-capacity wireless network, and a virtualization center.

Figure 7:
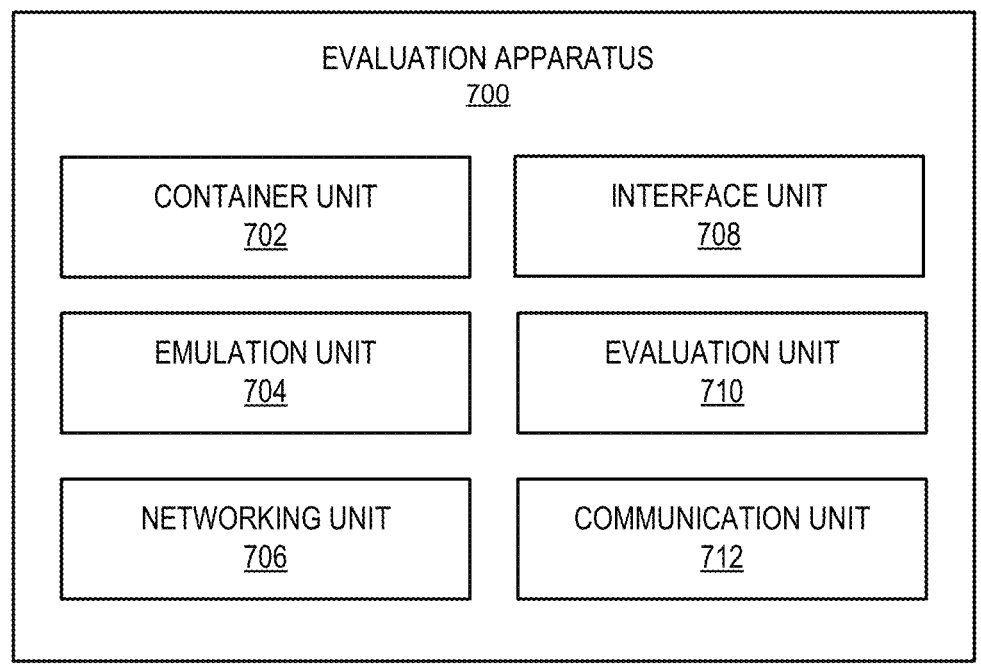
FIG. 7 illustrates an exemplary apparatus that facilitates the emulation of an edge rack, in accordance with an embodiment of the present application.

FIG. 7 illustrates an exemplary apparatus that facilitates the emulation of an edge rack, in accordance with an embodiment of the present application. Evaluation apparatus 700 can comprise a plurality of units or apparatuses which may communicate with one another via a wired, wireless, quantum light, or electrical communication channel. Apparatus 700 may be realized using one or more integrated circuits, and may include fewer or more units or apparatuses than those shown in FIG. 7. Further, apparatus 700 may be integrated in a computer system, or realized as a separate device that is capable of communicating with other computer systems and/or devices. Specifically, apparatus 700 can comprise units 702-712, which perform functions or operations similar to modules 622-630 of evaluation system 618 of FIG. 6, including: a container unit 702; an emulation unit 704; a networking unit 706; an interface unit 708; an evaluation unit 710; and a communication unit 712.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disks, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

The methods and processes described herein can be executed by and/or included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The foregoing descriptions of embodiments of the present invention have been presented only for purposes of illustration and description. They are not intended to be exhaustive or to limit this disclosure. Accordingly, many modifications and variations will be apparent to practitioners skilled in the art. The scope of the present invention is defined by the appended claims.

What is claimed is:

1. A method for facilitating emulation in a distributed environment, comprising:
   obtaining configuration of a physical edge rack, which includes a plurality of physical computing devices;
   presenting an emulated edge rack in a user interface, wherein the emulated edge rack is a digital twin of the physical edge rack;
   in response to receiving a user input via the user interface, emulating a power-on event on the emulated edge rack, wherein the emulated power-on event includes:
      emulating powering on a power supply of the emulated edge rack;
      emulating the power supply providing power to each of the plurality of physical computing devices; and
      emulating behavior and operations of each computing device of the physical edge rack upon the powering on of the power supply;
   in response to the emulation of the power-on event being complete, emulating the emulated edge rack as a powered-on edge rack; and
   emulating a deployment event to deploy a component to the powered-on emulated edge rack based on configuration information received via the user interface, wherein emulating the deployment event includes emulating configuration of the component on the emulated edge rack based on the configuration information.

2. The method of claim 1, further comprising:
   presenting, on the user interface, virtual connectivity among the emulated edge rack and a set of emulated network devices; and
   emulating network operations of the emulated edge rack with the emulated network devices.

3. The method of claim 1, wherein the component is one of: a compute node facilitating compute operations and a target node facilitating storage operations.

4. The method of claim 1, wherein the component is a vendor feature developed for the physical edge rack, wherein emulating the power-on event further comprises emulating a power-cycle for the emulated edge rack, which includes emulating powering on the power supply, in response to the deployment of the vendor feature, and wherein the emulated power-cycle is a digital twin of a power-cycle of the physical edge rack.

5. The method of claim 1, the component is a virtual machine that represents a virtualized computing device; and
wherein the method comprises emulating operations of the virtual machine on an emulated computing device of the emulated edge rack.

6. The method of claim 1, wherein the component is an emulation of an isolated segment of the emulated edge rack, wherein the isolated segment belongs to an end-to-end slice of resources defined in a high-capacity network.

7. The method of claim 1, wherein the physical edge rack is turned off and yet to be enabled in the distributed environment.

8. The method of claim 1, further comprising emulating the configuration of the physical edge rack based on a management interface specification implemented in the emulated edge rack.

9. The method of claim 8, further comprising:
emulating, on the emulated edge rack, a hardware component that facilitates the management interface specification in the emulated edge rack; and
emulating provisioning of the emulated edge rack from an emulated switch using the emulated hardware component.

10. The method of claim 1, further comprising:
receiving the configuration of the physical edge rack via a distributed management platform from a remote device, wherein the user interface is facilitated by the distributed management platform; and
executing the power-on event on the physical edge rack from the remote device via the distributed management platform based on an instruction.

11. A non-transitory computer-readable storage medium storing instructions that when executed by a computer cause the computer to perform a method for facilitating emulation in a distributed environment, the method comprising:
obtaining configuration of a physical edge rack, which includes a plurality of physical computing devices;
presenting an emulated edge rack in a user interface, wherein the emulated edge rack is a digital twin of the physical edge rack;
in response to receiving a user input via the user interface, emulating a power-on event on the emulated edge rack, wherein the emulated power-on event includes:
emulating powering on a power supply of the emulated edge rack;
emulating the power supply providing power to each of the plurality of physical computing devices; and
emulating behavior and operations of each computing device of the physical edge rack upon the powering on of the power supply;
in response to the emulation of the power-on event being complete, emulating the emulated edge rack as a powered-on edge rack; and
emulating a deployment event to deploy a component to the powered-on emulated edge rack based on configuration information received via the user interface, wherein emulating the deployment event includes emulating configuration of the component on the emulated edge rack based on the configuration information.

12. The non-transitory computer-readable storage medium of claim 11, wherein the method further comprises:
presenting, on the user interface, virtual connectivity among the emulated edge rack and a set of emulated network devices; and
emulating network operations of the emulated edge rack with the emulated network devices.

13. The non-transitory computer-readable storage medium of claim 11, wherein the component is one of: a compute node facilitating compute operations and a target node facilitating storage operations.

14. The non-transitory computer-readable storage medium of claim 11, wherein the component is a vendor feature developed for the physical edge rack, wherein emulating the power-on event further comprises emulating a power-cycle for the emulated edge rack, which includes emulating powering on the power supply, in response to the deployment of the vendor feature, and wherein the emulated power-cycle is a digital twin of a power-cycle of the physical edge rack.

15. The non-transitory computer-readable storage medium of claim 11, the component is a virtual machine that represents a virtualized computing device; and
wherein the method comprises emulating operations of the virtual machine on an emulated computing device of the emulated edge rack.

16. The non-transitory computer-readable storage medium of claim 11, wherein the component is an emulation of an isolated segment of the emulated edge rack, wherein the isolated segment belongs to an end-to-end slice of resources defined in a high-capacity network.

17. The non-transitory computer-readable storage medium of claim 11, wherein the physical edge rack is turned off and yet to be enabled in the distributed environment.

18. The non-transitory computer-readable storage medium of claim 11, wherein the method further comprises emulating the configuration of the physical edge rack based on a management interface specification implemented in the emulated edge rack.

19. The non-transitory computer-readable storage medium of claim 18, wherein the method further comprises:
emulating, on the emulated edge rack, a hardware component that facilitates the management interface specification in the emulated edge rack; and
emulating provisioning of the emulated edge rack from an emulated switch using the emulated hardware component.

20. The non-transitory computer-readable storage medium of claim 11, wherein the method further comprises:
receiving the configuration of the physical edge rack via a distributed management platform from a remote device, wherein the user interface is facilitated by the distributed management platform; and
executing the power-on event on the physical edge rack from the remote device via the distributed management platform based on an instruction.

* * * * *